United States Patent Office 3,447,337
Patented June 3, 1969

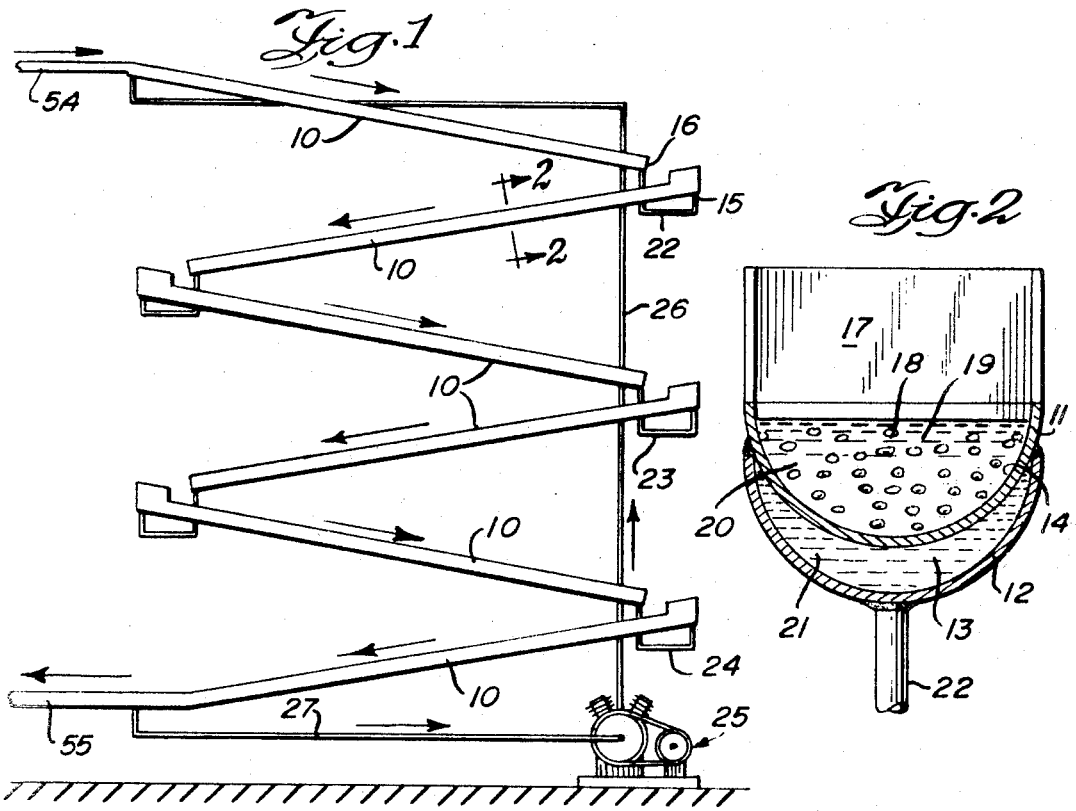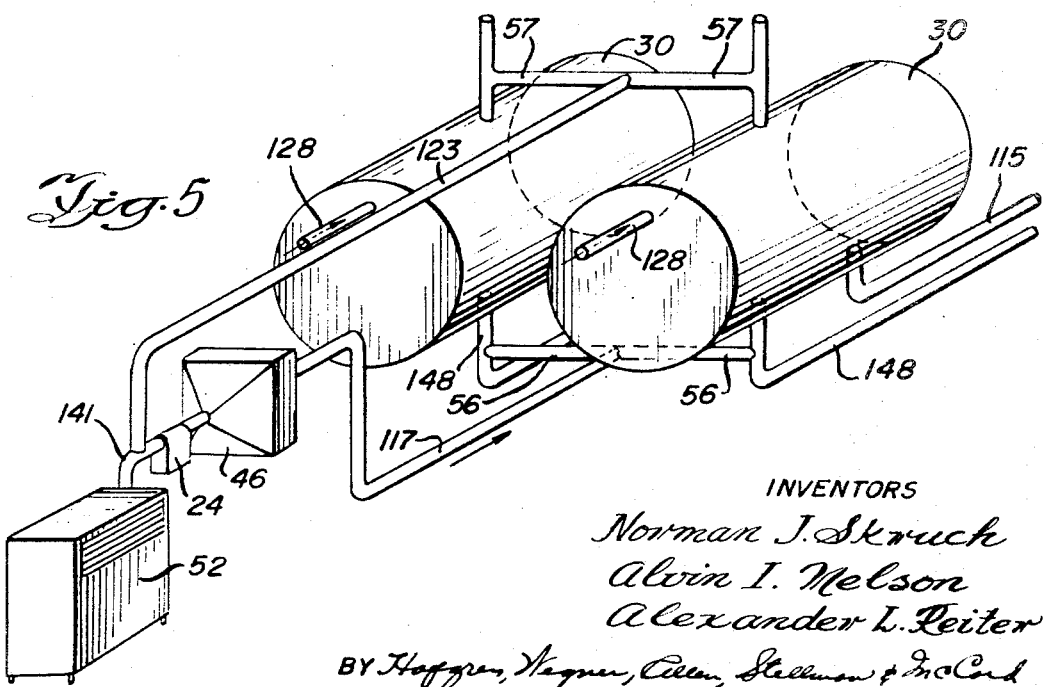

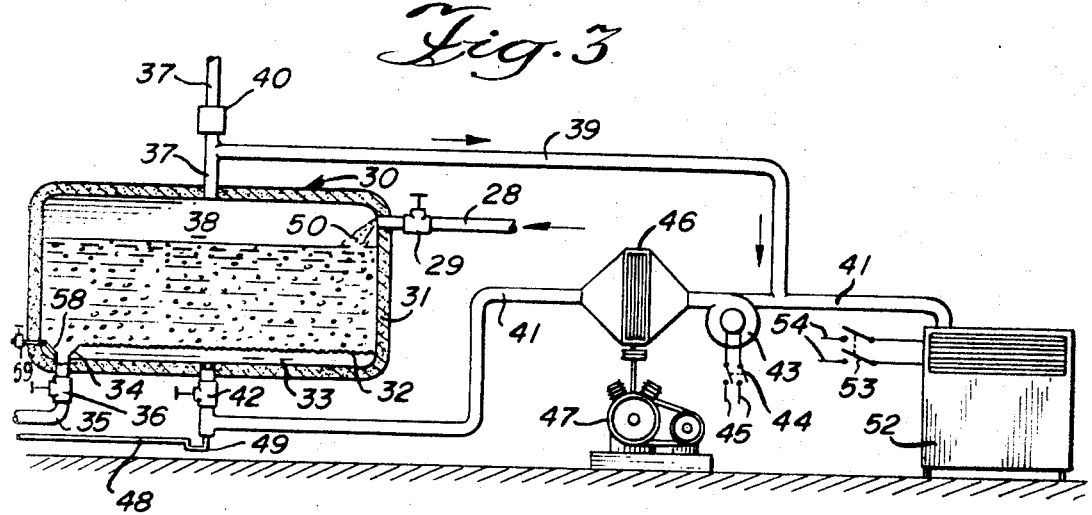
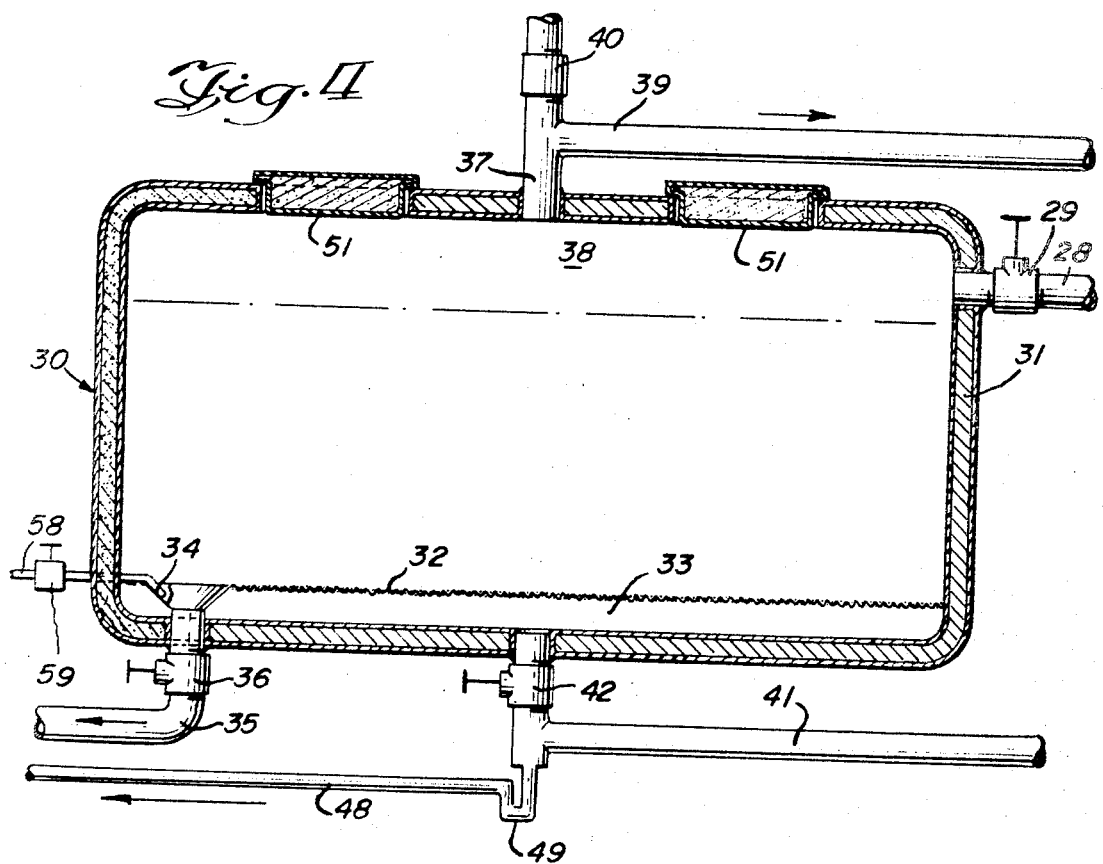

3,447,337
TRANSPORTING AND STORING FRUIT AND VEGETABLE PRODUCTS
Norman J. Skruch, St. Joseph, Alvin I. Nelson, Champaign, and Alexander L. Reiter, St. Joseph, Mich., assignors to Whirlpool Corporation, a corporation of Delaware
Filed Sept. 7, 1965, Ser. No. 485,418
Int. Cl. F25d *3/02;* A23b *7/04*
U.S. Cl. 62—318                                7 Claims

ABSTRACT OF THE DISCLOSURE

Apparatus for transporting and storing under preserving conditions fruit and vegetable products comprising a means for flowing an aqueous fluid containing the product into a container, means for separating the fluid in the container from the product to isolate the product, means for subjcting the isolated product in the container to a storage preserving atmosphere containing an amount of oxygen less than that found in ordinary air by introducing the atmosphere to the container, means for mixing the isolated product in the container after the storage period with an aqueous fluid and then means for conveying the product from the container by flowing the aqueous fluid containing the product from the container.

---

This invention relates to the transporting and storing of fruit and vegetable products.

It is customary to utilize a flowing stream of water to transport fruits and vegetables to and through a place of processing. One of the features of this invention is to provide improved apparatus for flowing an aqueous fluid containing a fruit or vegetable product to a place of storage, subjecting said product at said place of storage to a storage preserving atmosphere containing an amount of oxygen less than that found in normal air together with means for flowing an aqueous fluid containing the product from the place of storage after a desired storage time interval.

Another feature of the invention is to provide an improved method of transporting and storing under preserving conditions fruit and vegetable products wherein the product and an aqueous fluid are mixed to produce a flowable mixture followed by flowing this mixture to a place of storage while simultaneously chilling the mixture to prechill the product, isolating the product from the fluid at the place of storage for a storage period and then, during this period, subjecting the isolated product to a preserving atmosphere containing an amount of oxygen less than that found in normal air.

A further feature of the invention is to provide means and method for chilling the isolated product at the place of storage by chilling the atmosphere prior to its contacting the stored product.

Other features and advantages of the invention will be apparent from the following description of certain embodiments thereof as disclosed in the accompanying drawings. Of the drawings:

FIGURE 1 is a diagrammatic view of an apparatus for transporting a fruit or vegetable product to a place of storage while simultaneously chilling the product.

FIGURE 2 is an enlarged sectional view substantially along line 2—2 of FIGURE 1.

FIGURE 3 is a semidiagrammatic view of a portion of the storage system including a container and apparatus for providing a chilled preserving atmosphere to the container.

FIGURE 4 is a detailed vertical sectional view of the container of FIGURE 3 and associated parts after the aqueous fluid has been withdrawn from the container.

FIGURE 5 is a fragmentary perspective view of a second embodiment of the invention.

As is shown in FIGURES 1 and 2, the apparatus for transporting the fruit or vegetable, such as cherries or peas, includes a succession of downwardly inclined flumes 10 with the bottom of each emptying into the top of the next. Each flume as is shown in FIGURE 2 comprises a pair of internested semicylindrical troughs 11 and 12 spaced apart to provide a lower space 13. At least the upper trough 11 is made of metal or some other heat conducting material, as it is necessary that the space 13 be in heat transfer relationship to the space 14 of the upper trough 11. The end 15 of each lower flume that receives the discharge from the lower end 16 of the next above flume is provided with a splash shield 17 to reduce loss of product by the cascading fluid from splashing out of the flume end 15.

In the embodiment of FIGURE 1 there are six successive flumes 10. Any number desired may, of course, be used. The mixture 20 of fruit or vegetable product 18 such as the abovementioned peas or cherries and the aqueous fluid 19 such as water is in the upper trough 14.

The spaces 13 between the lower trough 12 and the upper troughs 11 are provided with liquid refrigerant 21 and these spaces are connected in series by interconnecting pipes 22, 23 and 24.

Liquid refrigerant is supplied to the spaces 13 from an ordinary refrigeration system 25. Thus, liquid refrigerant flows from the system 25 through a pipe 26 to the upper end of the topmost space 13 and flows down this space concurrently with the descending fluid and product mixture 20. This refrigerant then flows from the bottom of the lowest space 13 by way of a pipe 27 back to the refrigeration system 25. This system is the ordinary motor compressor-condenser type and provides a steady supply of liquid refrigerant to the series of flumes 10.

From the lowermost flume 10 the mixture 50 of aqueous fluid and product is directed through a pipe 28 controlled by a valve 29 to the top of a container 30 insulated from the surrounding atmosphere by heat insulation 31.

Positioned above but adjacent the bottom of the container 30 is a metal screen 32 to provide a space 33 beneath the screen. This screen 32 has at one end a downwardly tapered funnel 34 which leads to an exit pipe 35 by way of a valve 36.

An atmosphere recirculating pipe system is provided which includes an upwardly extending pipe 37 communicating with the upper space 38 within the container 30, a pipe 39 leading from the pipe 37 at an area between the container 30 and a pressure relief valve 40 in the pipe 37 and a pipe 41 leading from pipe 39 to the bottom of the container space 33 by way of a valve 42.

Positioned in the pipe 41 downstream of the pipe 39 is a motor operated blower 43 whose operation is controlled by a switch 44 in an electric line 45.

Also located in the pipe 41 downstream of the blower 43 is a refrigerant evaporator 46 that forms a part of an ordinary refrigeration system 47.

Extending from the pipe 41 beneath the valve 42 is a liquid drain line 48 having a conventional trap 49 therein.

At the top of the container 30 there are provided two insulated access doors 51 that provide access to the interior of the container for cleaning the container when necessary.

Communicating with the end of pipe 41 at the end opposite the evaporator 46 is a generator 52 for generating an atmosphere rich in carbon dioxide and weak in oxygen by burning a carbonaceous fuel in the presence of air.

The operation of the generator is controlled by a switch 53 in an electric power line 54.

The burning of the fuel in the generator 52 is preferably accomplished in the presence of a combustion catalyst. One embodiment of such a generator is disclosed in Bedrosian et al. Patent No. 3,102,778, assigned to the same assignee as the present application. This atmosphere which is low in oxygen content as compared to normal air and is high in carbon dioxide content also as compared to normal air has a preserving effect upon fruit and vegetable products within the container 30. Thus, as is explained in the above Bedrosian et al. patent, as well as other patents also assigned to the same assignee, stored harvested animal and vegetable materials respirate according to the following approximate respiratory change equation which is described in the above Bedrosian et al. patent:

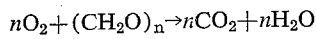

$$nO_2 + (CH_2O)_n \rightarrow nCO_2 + nH_2O$$

This equation expresses the chemical reactions involved on respiration in a simplified manner. The $(CH_2O)_n$ represents a carbohydrate molecule of the material that is destroyed during the degradation or deterioration process during storage by consuming oxygen and giving off carbon dioxide and water. As was pointed out in the patent, this degradation equation can be slowed considerably so that materials can be stored for much longer periods of time by decreasing the amount of oxygen from that found in normal air. This reduces the progress of the equation in the direction indicated so that destruction of the molecules of the stored materials is very greatly reduced thereby increasing considerably the storage period.

The apparatus and method of the present invention utilized the above discoveries to permit retaining the fruit or vegetable as long as desired in the container 30. Then, when the processing lines and equipment are ready for processing the fruit or vegetable is transferred from the container 30 to the processing equipment (not shown) by introducing more aqueous fluid such as water into the container 30 to suspend the fruit or vegetable and then flowing this aqueous suspension through the pipe 35 by way of the open valve 36 to the processing equipment.

The operation of the equipment of the embodiment of FIGURES 1–4 is as follows:

The aqueous fluid mixture 20 of fluid 19 and fruit or vegetable product 18 is directed into the flume system by way of a feed line 54. From here the aqueous mixture flows down the successive flumes 10 to the lowermost conduit 55 which connects to the pipe 28. The mixture flows through this pipe 28 and open valve 29 into the interior of the container 30 as indicated at 50 in FIGURE 3.

While the mixture of aqueous fluid and suspended fruit or vegetable is flowing down the successive flumes 10 by gravity liquid refrigerant 21 in the space 13 from the supply line 26 keeps the fluid 19 and thus the suspended product 18 chilled. Thus, with the exemplary peas, the chilling is sufficient to reduce them to a temperature in one embodiment of about 35° F. at the flume exit conduit 55.

As soon as the container has been filled up to approximately the level of the pipe 28 valve 29 is closed and valve 42 opened to drain the aqueous fluid from the fruit or vegetable product 18. This fluid flows into the space 33 beneath the screen 32 and out the drain line 48 by way of the liquid trap 49. The product gathers on the screen 32. In general, there will be sufficient product in the aqueous fluid so that when the liquid is drained the container will be approximately half full of the drained product.

In order to preserve the thusly drained product until it is desired to convey it to the processing equipment in the manner previously described, it is subjected to the low oxygen content preserving atmosphere, also as previously described. In order to accomplish this, the generator 52 is powered by closing the switch 53, the blower 43 is powered by closing the switch 44 and the refrigeration system 47 provides refrigerant to the evaporator 46 in order to refrigerate the atmosphere.

When the apparatus is operated during the storage period the atmosphere from the generator 52 is directed through the pipe 41 and through the evaporator 46 where the atmosphere is chilled. Because the pressure of the atmosphere leaving the generator is insufficient to cause a desired rate of flow through the apparatus, the blower 43 provides additional pressure sufficient to achieve a desired flow rate. The blower therefore forces the atmosphere through the evaporator 46 and pipe 41 and up through the valve 42 into the bottom space 33 beneath the screen 32. The space 33 permits distributing the atmosphere uniformly into and through the stored drained product into the space 38 above the product.

From the space 38 the atmosphere plus the air previously occupying the space 38 flows through conduit 37 and conduit 39 to conduit 41, where it combines with atmosphere from generator 52. This increases the output of blower 43 which forces the pressure relief valve 40 open to allow a quantity of fluid equal to the output of generator 52 to vent continuously to the ambient atmosphere.

Recirculation and venting is continued during "pull down" (the period of time necessary to replace the initial atmosphere within space 38 with the storage atmosphere) and the storage period.

As can be seen the valve 42 controls not only the flow of atmosphere from the pipe 41 into the container space 33 but also controls the flow of aqueous fluid from the container 30 into the drain line 48 when the fluid is being drained from the product.

Valve 40 during recirculation operates as a pressure relief valve so as to bleed some of the recirculated atmosphere out of the system through the line 37 above the valve. This is necessary in order to compensate for the amount of fresh atmosphere supplied to the system from generator 52 which is always in excess of that required to fill the system. In general, the amount of atmosphere bled off in this manner will be substantially equivalent to the amount of fresh atmosphere output from the generator 52.

As will be noted from the above description, the atmosphere from the generator 52 flowing through the pipe 41 and valve 42 into the container 30 not only provides preserving of the stored product in the container but also provides refrigeration. Thus, the stored product is chilled not by refrigerating the container 30 directly but by refrigerating the atmosphere in the inlet pipe 41 before the atmosphere is directed into the container. This is a very important feature of the present invention, as it greatly simplifies the equipment in that there is no necessity for building refrigerant coils into the container 30 proper.

At the end of the storage period the generator 52, blower 43 and refrigeration system 47 are stopped. Valve 29 is then opened to permit aqueous fluid only, such as water, to pass through the pipe 28 into the interior of the container 30. When sufficient fluid has been admitted to provide a flowable mixture valve 29 is closed and valve 36 is opened. The fluid mixture then flows by gravity out the funnel 34, valve 36 and pipe 35 to the place of processing (not shown). A water supply line 58 having a control valve 59 therein provides an auxiliary supply or stream of water to the funnel area to aid in draining the product from container 30.

During the operation of the apparatus the refrigeration system 47 operates continuously even during the storage period. This is done in order that the evaporator 46 will always be at the proper temperature for chilling the atmosphere when needed. The atmosphere generator 52 and blower 43, in contrast, are only operated during the storage period while the drained product is in the container 30 as described.

Although in the example given above for peas the product was supplied to the container 30 at about 35° F. the further refrigeration on recirculation in this specific example reduced the temperature still lower to about 33° F. During storage, it is preferred that the product be maintained as near 32° F. as possible so long as the product is not actually frozen.

The method and apparatus of this invention is particularly adapted for transporting and storing tender and fragile flowable fruits and vegetables such as peas, cherries, berries and the like. The invention results in rapid cooling of the fruit or vegetable product during its transporting in the flume system 10. It also provides flexibility in the use of the processing equipment as the product may be stored under preserving conditions of temperature and character of surrounding atmosphere for any length of time desired until ready for processing.

The apparatus has many advantages in that it fits easily into existing processing lines and the equipment required other than the generator 52 is quite simple. A very important safety factor is that the product is stored in a container 30 that can not be simultaneously entered by workers. After a very short time it has been found that the preserving atmosphere of the type described above is not sufficient to sustain life.

Another advantage is that the container 30 have a high loading efficiency ratio. Furthermore, the containers are quite simple, as it is not necessary to supply refrigeration coils in the containers themselves.

As disclosed in the above Bedrosian et al. patent as well as other storage atmosphere patents to the same assignee, the amount of oxygen in the storage atmosphere is preferably about 1–10% by volume and the amount of carbon dioxide is about 0.5–6 times the amount by volume of oxygen with the remainder of the atmosphere being inert gas such as nitrogen and the trace gases of ordinary air. In most instances, the amount of carbon dioxide is preferably about 1–15% by volume when the amount of oxygen is about 1–10%.

The embodiment of FIGURE 5 illustrates dual storage containers 30 supplied from a single atmosphere generator 52 and a single refrigerant evaporator 46. This embodiment is provided because it has been found that an average capacity generator can supply two containers that may be operated separately or simultaneously. Thus, each container 30 has its own fluid inlet pipe 128 and its own product outlet pipe 115. In order to provide for recirculation of refrigerated atmosphere through the containers 30, there is provided a single pipe 117 from the evaporator 46 and branch pipes 56 to each container 30. Each container also has its own return pipe 57 leading to a common return pipe 123 which connects to pipe 141 between the generator 52 and the blower 26. Each container 30 also has its own fluid drain pipe 148. For simplicity of illustration the corresponding valves are not shown in the embodiment of FIGURE 5, as their positions are obvious in view of the detailed showing of the first embodiment.

Having described our invention as related to the embodiments shown in the accompanying drawings, it is our invention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. Apparatus for transporting and storing under preserving conditions fruit and vegetable products, comprising: a container; means for flowing an aqueous fluid containing said product into said container including a flume having a pair of compartments therein in heat transfer relationship through one of which the product and the aqueous fluid flows; means for refrigerating the other compartment for chilling the aqueous fluid and product; means for separating said aqueous fluid in said container from the product to isolate the separated product in the container; means for introducing a storage preserving atmosphere to the container for subjecting said isolated product in the container to said storage preserving atmosphere, the atmosphere containing an amount of oxygen less than that found in normal air; means for mixing said isolated product in the container with aqueous fluid after a storage interval; and means for thereafter flowing the aqueous fluid containing said product from said container.

2. Apparatus for transporting and storing under preserving conditions fruit and vegetable products, comprising: a container; means for flowing an aqueous fluid containing said product into said container; means for separating said aqueous fluid in said container from the product to isolate the separated product in the container; a water pervious support in said container for retaining said separated product thereon; means for introducing a storage preserving atmosphere into said container beneath said support for subjecting said isolated product in the container to said atmosphere, the atmosphere containing an amount of oxygen less than that found in normal air; means for mixing said isolated product in the container with aqueous fluid after a storage interval; and means for flowing the aqueous fluid containing said product from said container.

3. Apparatus for transporting and storing under preserving conditions fruit and vegetable products, comprising: a container; means for flowing an aqueous fluid containing said product into said container; means for separating said aqueous fluid in said container from the product to isolate the separated product in the container; means for introducing a storage preserving atmosphere to the container for subjecting said isolated product in the container to said storage preserving atmosphere, the atmosphere containing an amount of oxygen less than that found in normal air, said means for subjecting having a recirculating atmosphere conduit system including said container; means for introducing fresh atmosphere in said conduit system; means for withdrawing excess said atmosphere from said system; means for mixing said isolated product in the container with aqueous fluid after a storage interval; and means for flowing the aqueous fluid containing said product from said container.

4. Apparatus for transporting and storing under preserving conditions fruit and vegetable products, comprising: a container; means for flowing an aqueous fluid containing said product into said container; means for separating said aqueous fluid in said container from the product to isolate the separated product in the container; means for introducing a storage preserving atmosphere to the container for subjecting said isolated product in the container to said storage preserving atmosphere, the atmosphere containing an amount of oxygen less than that found in normal air, said means for subjecting having a recirculating atmosphere conduit system including said container; means for introducing fresh atmosphere in said conduit system; means for withdrawing excess said atmosphere from said system; a refrigerated member in said system over which said atmosphere flows for chilling of said atmosphere; means for mixing said isolated product in the container with aqueous fluid after a storage interval; and means for flowing the aqueous fluid containing said product from said container.

5. Apparatus for transporting and storing under preserving conditions fruit and vegetable products, comprising: a container; means for flowing an aqueous fluid containing said product into said container; means for separating said aqueous fluid in said container from the product to isolate the separated product in the container; means for introducing a storage preserving atmosphere to the container for subjecting said isolated product in the container to said storage preserving atmosphere, the atmosphere containing an amount of oxygen less than that found in normal air, said means for subjecting having a recirculating atmosphere conduit system including said container; means for introducing fresh atmosphere in said conduit system externally of said container; means for withdrawing excess said atmosphere from said system; a refrigerated member in said system upstream of said container for chilling said atmosphere, said means for introducing fresh atmosphere in said system being located upstream of said refrigerated member; means for mixing said isolated product in the container with aqueous fluid after a storage interval; and means for flowing the aqueous fluid containing said product from said container.

6. Apparatus for transporting and storing under preserving conditions fruit and vegetable products, comprising: a heat insulated container; means for flowing an aqueous fluid containing said product into said container including a flume having a pair of compartments therein in heat transfer relationship through one of which the aqueous fluid and product flows; means for refrigerating the other compartment for chilling the aqueous fluid and thus the product; means for draining said aqueous fluid in said container from the product to isolate the separated product in the container, said container having a water pervious support retaining the product above the container bottom; means for subjecting said isolated product in the container to a storage preserving atmosphere containing an amount of oxygen less than that found in normal air, said means for subjecting the product to said atmosphere including means for introducing atmosphere beneath said support from externally of the container; means for mixing said isolated product in the container with aqueous fluid after a storage interval; and means for flowing the aqueous fluid containing said product from said container.

7. Apparatus for transporting and storing under preserving conditions fruit and vegetable products, comprising: a heat insulated container; means for flowing an aqueous fluid containing said product into said container including a flume having a pair of compartments therein in heat transfer relationship through one of which the aqueous fluid and product flows; means for refrigerating the other compartment for chilling the aqueous fluid and product; means for draining said aqueous fluid in said container from the product to isolate the separated product in the container, said container having a water pervious support retaining the product above the container the bottom; means for subjecting said isolated product in the container to a storage preserving atmosphere containing an amount of oxygen less than that found in normal air, said means for subjecting the product to said atmosphere including means for introducing atmosphere beneath said support from externally of the container; a recirculating conduit system including said container forming a part of said means for subjecting product to the atmosphere; means for introducing fresh atmosphere in said conduit system; means for withdrawing excess atmosphere from the system to compensate for the amount of introduced fresh atmosphere, said means for introducing and means for withdrawing both being located externally of the container; a refrigerated member in said conduit system upstream of said container for chilling the atmosphere and thus the container and the contained product; a blower in the conduit system externally of the container for forcing atmosphere through the system; a generator forming a part of said means for introducing fresh atmosphere to the system with the blower being located in the system downstream from the generator and upstream from the refrigerated member; means for mixing said isolated product in the container with aqueous fluid after a storage interval; and means for flowing the aqueous fluid containing said product from said container.

References Cited

UNITED STATES PATENTS

| | | | |
|---|---|---|---|
| 2,162,415 | 6/1939 | Allen | 99—154 |
| 3,102,778 | 9/1963 | Bedrosian | 99—154 XR |

A. LOUIS MONACELL, *Primary Examiner.*

J. M. HUNTER, *Assistant Examiner.*

U.S. Cl. X.R.

62—64, 374; 99—154, 193, 239, 269